(12) United States Patent
Henley et al.

(10) Patent No.: US 6,983,761 B2
(45) Date of Patent: Jan. 10, 2006

(54) METHOD AND APPARATUS FOR A PRESSURE REGULATOR WITH HIGH-PRESSURE RESERVE

(75) Inventors: Jason S. Henley, Salem, OR (US); Dale Carpenter, 930 N. Portland, Gilbert, AZ (US) 85234

(73) Assignee: Dale Carpenter, Gilbert, AZ (US)

( * ) Notice: Subject to any disclaimer, the term of this patent is extended or adjusted under 35 U.S.C. 154(b) by 279 days.

(21) Appl. No.: 10/434,605

(22) Filed: May 9, 2003

(65) Prior Publication Data

US 2004/0221894 A1    Nov. 11, 2004

(51) Int. Cl.
G05D 16/10    (2006.01)

(52) U.S. Cl. .......................... 137/505.25; 137/315.04; 251/285

(58) Field of Classification Search .......... 137/505.25, 137/505.28, 315.04, 15.19; 251/285
See application file for complete search history.

(56) References Cited

U.S. PATENT DOCUMENTS

| | | | | |
|---|---|---|---|---|
| 3,211,175 A | * | 10/1965 | Replogle | 137/505.28 |
| 3,437,109 A | * | 4/1969 | Egerer et al. | 137/505.25 |
| 3,511,266 A | * | 5/1970 | Phlipot | 137/505.25 |
| 3,698,425 A | * | 10/1972 | Fisher | 137/505.25 |
| 4,543,985 A | | 10/1985 | Healy et al. | |
| 5,613,483 A | | 3/1997 | Lukas et al. | |
| 5,669,369 A | | 9/1997 | Scott | |
| 5,678,602 A | * | 10/1997 | Cannet et al. | 137/505.25 |
| 5,881,757 A | | 3/1999 | Kuster et al. | |
| 5,887,852 A | * | 3/1999 | Delaisement | 251/285 |
| 2002/0104524 A1 | | 8/2002 | Reible | |

* cited by examiner

Primary Examiner—Stephen M. Hepperle
(74) Attorney, Agent, or Firm—Letham Patent Group LLC; Lawrence Letham

(57) ABSTRACT

An apparatus for regulating fluid pressure comprising an inlet for accepting fluid at high pressure and an outlet for supplying fluid at a predetermined pressure to the device that requires fluid flow. A piston and seal form the valve used to regulate the fluid pressure at the outlet. Another aspect of the invention is a high-pressure chamber to that provides a reserve of fluid for continuous regulated pressure during periods of sustained use. The regulated pressure is adjustable using a sphere and ramp mechanism. One embodiment of the invention is adapted for use with a paintball marker.

16 Claims, 2 Drawing Sheets

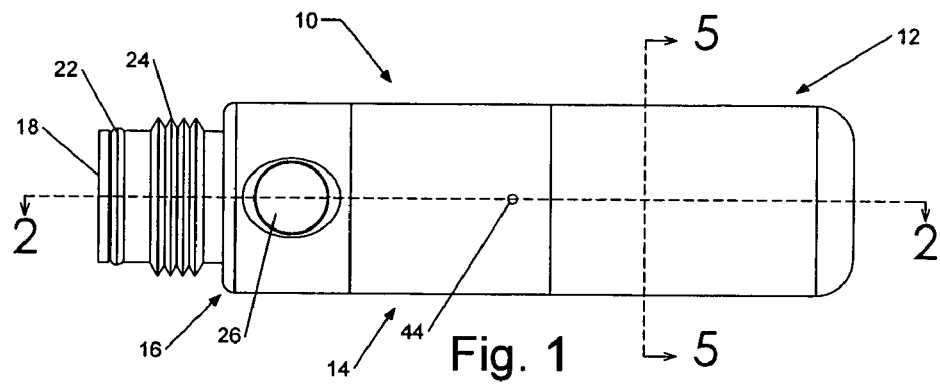
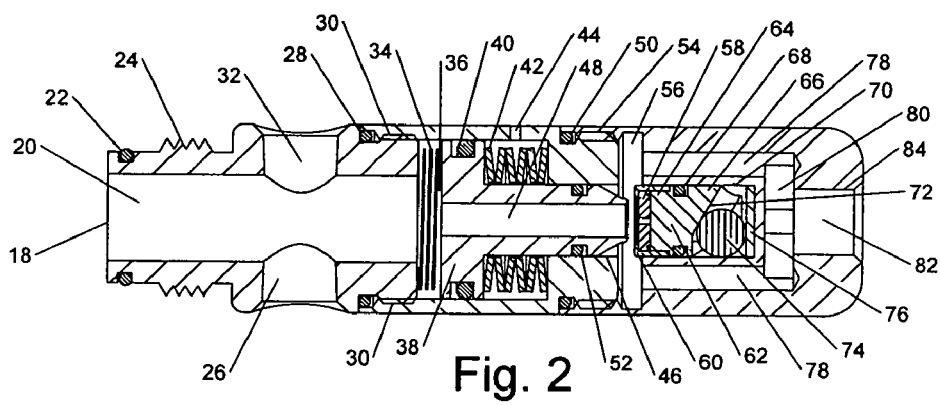
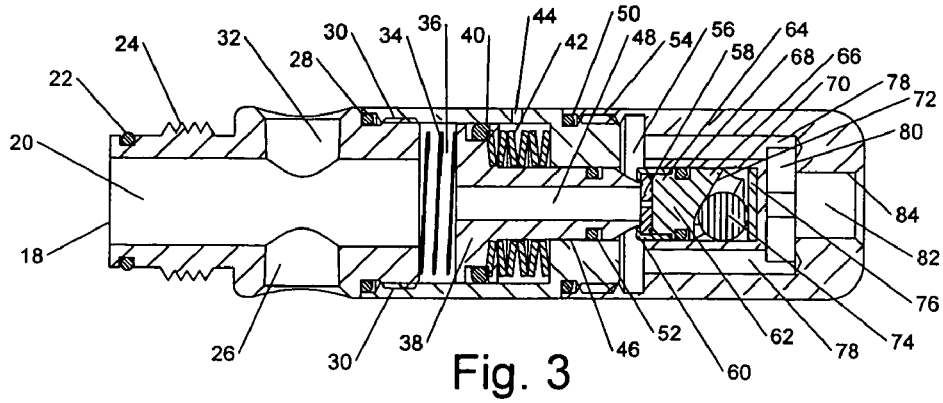

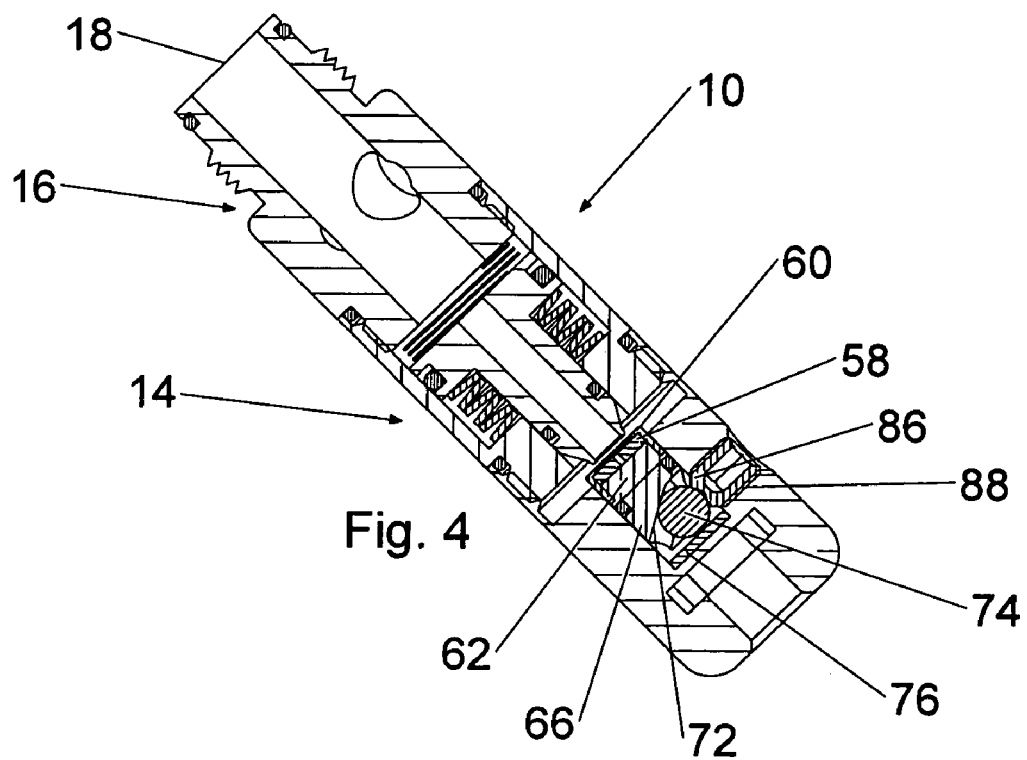
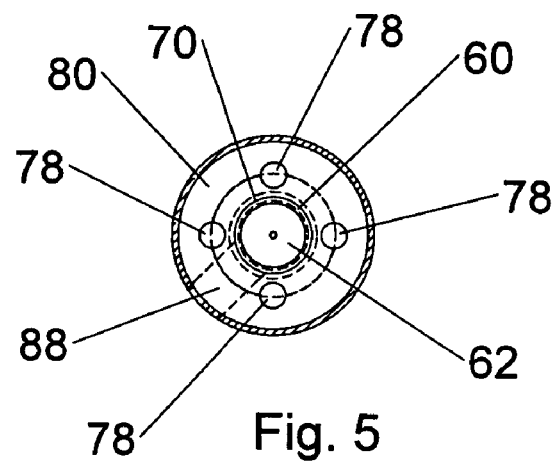

METHOD AND APPARATUS FOR A PRESSURE REGULATOR WITH HIGH-PRESSURE RESERVE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to pressurized fluid control and regulation valves and more particularly to an air pressure regulator with a high-pressure reserve for use with a paintball marker.

2. Description of Related Art

The sport of paintball is an activity where the participants use air-powered paintball markers to impel frangible balls filled with colored liquid at opposing participants. When the frangible ball, also referred to as a paintball, strikes an opponent, it breaks and releases the contents of the paintball leaving a mark. The air used to impel a paintball, in the typical paintball marker, is normally stored in a bottle at a pressure in the range of approximately 800 to 4,500 psi. The pressured air exits the bottle into a primary regulator that regulates and supplies air in the range of approximately 400 to 1000 psi. The primary regulator remains attached to the bottle and provides a connector to allow the bottle to be refilled. If the paintball marker user does not keep the refill connector covered, dirt can be forced into the connector during use in the field. If the refill connector is not cleaned before refilling the bottle, dirt can be swept into the bottle. It is common for dirt in the air supply to stick to internal seals and to interfere with the movement of internal parts; thereby, causing the paintball marker to malfunction.

The bottle is generally attached to the butt of the paintball marker and provides a secondary function of stabilizing the marker much like the stock of a conventional rifle. The pressured air from the primary regulator pass through a flexible hose, commonly made of plastic or other durable material with an approximate outside diameter of ¼ inch, to a secondary regulator. Air from the primary regulator enters the secondary regulator, which regulates and supplies air to the paintball marker in the range of approximately 80 to 600 psi. The paintball marker uses the air supplied by the secondary regulator to impel the paintball out of the barrel of the marker. Most secondary regulators threadedly attach to the bottom of the paintball marker a short distance in front of the trigger guard. The position of the secondary regulator enables it to serve as a handgrip to stabilize the paintball marker while in use; however, the location in which the supply hose from the primary regulator attaches to the secondary regulator can limit the secondary regulator's usefulness as a handgrip. If the hose from the primary regulator attaches to the secondary regulator on the side, it is difficult to use the secondary regulator as a handgrip as the position of the hose interferes with the user's hand or forces the user's grip into an unnatural position.

Some paintball markers are capable of impelling in excess of 20 paintballs per second. A common characteristic of paintball markers under rapid and sustained use is that the paintballs impelled towards the end of a sequence leave the paintball marker barrel with less velocity and travel a shorter distance than the balls at the beginning of the sequence. The decline of paintball velocity from the start of a sustained sequence to the end of the sequence decreases accuracy.

In paintball sport competitions, the velocity at which a paintball marker impels a paintball from its barrel is limited to 300 fps or less to protect the participants from harm. A direct relationship exists between the gas pressure provided to the marker and the speed at which a paintball leaves the barrel. One method used to adjust the muzzle velocity of an exiting paintball is to increase or decrease the air pressure provided by the secondary regulator. Generally, rotating an adjustment screw or knob increases or decreases the gas pressure supplied by the secondary regulator to the paintball marker and subsequently increases or decreases the muzzle velocity of an exiting paintball. The adjustments must be made while operating the paintball marker and while simultaneously measuring the exit velocity of an impelled paintball with a chronograph. The location of the adjustment screw or knob affects the ease of adjusting the gas pressure of the secondary regulator. Adjustment screws or knobs located at the bottom of the secondary regulator make adjusting the gas pressure, and hence the exit velocity of a paintball, awkward.

Accordingly, there is a need for an air pressure regulator that can maintain a constant muzzle velocity during periods of rapid and sustained use, that allows convenient adjustment from the side, that minimizes the negative impact of dirt in the air supply and that acts as a convenient, natural handgrip. The present invention satisfies these needs, as well as others, and overcomes some of the deficiencies in current air driven projectile devices.

BRIEF SUMMARY OF THE INVENTION

The present invention generally comprises an apparatus for regulating fluid pressure. The inlet to the apparatus accepts fluid from the high-pressure source. The outlet provides fluid at a predetermined, regulated pressure to a device that requires fluid flow at the predetermined pressure. One embodiment of the invention is particularly suitable for use as a secondary regulator for a paintball marker and is shown in this context for illustration. However, it will be understood that the regulator of the present invention may be used to regulate fluid pressure in any relevant setting.

According to one aspect of the invention, a regulator is provided that has a regulator body with an inlet coupled to a source of high-pressure fluid and an outlet connected to a device that requires a regulated fluid flow. The regulator includes a biased piston centrally disposed in the regulator body that has a piston stem that fits in a corresponding seat to seal the passage through the regulator when the pressure reaches a threshold level. The fluid pressure is preferably adjustable. In one embodiment, the pressure is adjusted by the axial displacement of the seal seat.

The regulator inlet and outlet are placed axially, with respect to each other, to facilitate its connection between the high-pressure source and the device that requires airflow. One embodiment of the invention provides a method for adjusting the pressure of the fluid provided at the regulator outlet. A screw that enters the regulator angularly to the inlet and outlet axis, controls the adjustment mechanism internal to the regulator.

According to another aspect of the invention, the regulator includes a high-pressure chamber configured to store fluid at high pressure. The high-pressure chamber is in fluid communication with the valve used to control the pressure at the regulator outlet. The high-pressure chamber provides a reserve of fluid to supplement the fluid entering from the high-pressure source during a period of sustained demand by the device that requires fluid flow. The internal passages of the regulator are sized to provide consistent airflow during sustained use and positioned to facilitate placing the inlet and outlet axially with respect to each other. In one embodiment, a piston with an axial bore, open at both ends, is used in conjunction with a seal to regulate the pressure of the gas at the regulator outlet. The diameter of the axial bore, in cooperation with other passages internal to the regulator, and the high-pressure chamber, act to provide the necessary airflow during periods of sustained demand.

Further aspects of the embodiment of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The embodiment of the invention will be more fully understood by reference to the following drawings which are for illustrative purposes only:

FIG. 1 is a side view of one embodiment of the invention.

FIG. 2 is a cross-sectional view of the embodiment of the invention of FIG. 1 taken along the line 2—2, showing the regulator in the open position.

FIG. 3 is a cross-sectional view of the embodiment of the invention of FIG. 2 showing the regulator in the closed position.

FIG. 4 is a perspective cross-sectional view of the embodiment of the invention shown in FIG. 2 rotated clockwise by 45 degrees, showing the regulator in the open position.

FIG. 5 is a cross-sectional view of the embodiment of the invention of FIG. 1 taken along the lines 5—5 in FIG. 1.

DETAILED DESCRIPTION OF THE PREFERRED EMBODIMENT

Referring more specifically to the drawings, for illustrative purposes, the preferred embodiment of the invention is the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Turning now to FIG. 1, a modular regulator body 10 is shown having three sections: a top section 16, a center section 14 and a base section 12, connect together by threads 30 and threads 54 to form a regulator body. The top section 16 connects to a device that requires regulated fluid pressure, such as a paintball marker (not shown), with external threads 24. An o-ring 22 forms an airtight seal between the top section 16 and the paintball marker (not shown). An axial bore through the top section 16 forms a regulated pressure chamber 20. Air from the regulated pressure chamber 20 passes through an outlet 18 into the paintball marker (not shown). Two threaded instrument bores 26 and 32 made angularly to the axial bore in top section 16, allow instrumentation, such as a pressure gauge, to monitor the regulated pressure chamber 20.

A piston chamber 36 is located in the center section 14. A piston stem bore 46 is a passage between the piston chamber 36 and an end of the center section 14. A piston 38 is positioned in the center section 14 with the piston head located in the piston chamber 36 and the piston stem inserted into the piston stem bore 46. The inside diameter of the piston chamber 36 and the piston stem bore 46 are greater than the outside diameter of the piston head and the piston stem, respectively; thereby allowing the piston 38 to move axially in center section 14. O-rings 40 and 52 form an airtight seal with the inside of the piston chamber 36 and the piston stem bore 46, respectively. A bleed hole 44 allows the escape of air trapped between o-rings 40 and 52 during assembly.

A main spring 42 is placed between the piston head and the closed end of the piston chamber 36. Energy from the main spring 42 forces the piston 38 towards top section 16. A secondary spring 34 is placed between the top section 16 and the piston head. The force provided by the secondary spring 34 is less than the force provided by the main spring 42. The piston 38 stops in its movement towards the top section 16 when it compresses secondary spring 34 and forces it against the top section 16.

The base section 12 threadedly attaches to a high-pressure source (not shown) at an inlet 82 using threads 84. The inlet is open at both ends and allows fluid communication between the high-pressure source and a high-pressure chamber 80. On a side of the high-pressure chamber 80, opposite the inlet 82, bypass bores 78, open at both ends, provide fluid communication between the high-pressure chamber 80 and a seal chamber 56. The bypass bores 78 are arranged around the circumference of a seal seat bore 70. The seal seat bore 70 is open at the seal chamber 56 and penetrates the base section 12 axially towards the high-pressure chamber 80, but the seal seat bore 70 does not enter or provide fluid communication with the high-pressure chamber 80. The axial position of the seal seat bore 70 and the circumferential arrangement of the bypass bores 78 allow the axial placement of the inlet 82 and the outlet 18; thereby, allowing the hose from the high-pressure source to enter the body 10 at an end of the body 10 and not through the side of the body 10.

A seal seat 62 is positioned in the seal seat bore 70 and is slidable therein. A seal end 64 of the seal seat 62 is adapted to seal a piston passage 48. Contact between the piston 38 and a seal 58 stops fluid communication between the seal chamber 56 and the piston passage 48. An adjustment end 66 of the seal seat 62 is shaped to translate the movement of an adjustment sphere 74 into axial movement of the seal seat 62. An adjustment screw 86 threadedly engaged in an adjustment bore 88 controls the movement of the adjustment sphere 74. The adjustment bore is preferably perpendicular to the seal seat bore 70 axis. An adjustor floor 76 provides a hardened surface for the adjustment sphere to push against and protects the closed end of the seal seat bore 70 from being gouged. O-ring 68 forms an airtight seal and stops air from passing from the seal chamber 56 to the adjustment end 66 of the seal seat 62.

The piston passage 48 is an axial passage, open at both ends, that provides fluid communication between the regulated pressure chamber 20 and the seal chamber 56 when the piston 38 is in the open position as shown in FIG. 2. In the open position, the seal 58 does not contact the piston stem or close the piston passage 48. When the piston 38 is in the closed position, as shown in FIG. 3, the seal 58 contacts the piston stem and forms an airtight seal, thereby stopping fluid communication between the seal chamber 56 and the regulated pressure chamber 20.

FIG. 4 shows a cross-sectional view highlighting the preferred adjustment mechanism. The adjustment bore 88 is a threaded bore, open between the exterior of the base section 10 and the seal seat bore 70. The adjustment screw 86 is threadedly disposed in the adjustment bore 88 and contacts the adjustment sphere 74 (contact not shown for clarity of adjustment mechanism). Turning the adjustment screw 86 clockwise forces the adjustment screw 86 against the adjustment sphere 74. The adjustment sphere in turn is forced against the ramp 72, which in turn forces the seal seat 62 to move axially closer to the piston 38. Moving the seal seat 62 closer to the piston 38 decreases the air pressure required in the regulated pressure chamber 20 to move the piston 38 from the open position to the closed position. Turning the adjustment screw 86 counter-clockwise allows the adjustment sphere 74 to move away from the ramp 72 and as a result, the seal seat 62 moves axially away from piston 38. Moving the seal seat 62 away from the piston 38 increases the air pressure required in the regulated pressure chamber 20 to move the piston from the open to the closed position. The air pressure required in the regulated pressure chamber 20 to move the piston 38 into the closed position is the air pressure delivered to the paintball marker through the outlet 18. The ramp forms an approximate 30-degree angle with the closed-end of the seal seat bore 70. Although an approximate 30-degree angle is preferred, the angle of the ramp to the closed-end of the seal seat bore 70 can be in the range of approximately 10 degrees to approximately 50 degrees and still provide the axial movement required of the seal seat 62 to control the pressure in the regulated pressure chamber 20. The ramp 72 is part of a groove on the adjustment end 66 that directs the movement of the adjustment sphere against the ramp 72; thereby translating lateral movement of the adjustment sphere 74 into axial movement of the seal seat 62. The end of the adjustment screw 86 that contacts the adjustment sphere 74 is preferably flat; however, the end of adjustment screw 86 can be of any shape, whether it be flat, concave, convex or irregular in shape.

When the regulator is attached to the paintball marker and just prior to pulling the paintball marker trigger, the regulated pressure chamber 20 is filled with air at the predetermined pressure and the piston 38 is in the closed position, as depicted in FIG. 3. Pulling the paintball marker trigger, opens a valve inside the marker that allows the air in the regulated pressure chamber 20 to rapidly exhaust through outlet 18. The paintball marker then closes its valve. When the air leaves the regulated chamber 20, the main spring 42 forces the piston 38 into the open position, as depicted in FIG. 2. With the piston 38 in the open position, high-pressure air enters through the inlet 82 into the high-pressure chamber 80, through the bypass bores 78 into the seal chamber 56, through the piston passage 48 into the regulated pressure chamber 20. The influx of high-pressure air increases the pressure in the regulated pressure chamber 20, which in turn pushes against the piston head. When the air pressure in the regulated pressure chamber 20 reaches the predetermined, regulated pressure, the force exerted by the main spring 42 is overcome and the piston 38 is forced into the closed position. Pulling the paintball marker trigger re-starts the sequence.

The force exerted by the main spring 42 works in cooperation with the position of the seal seat 62 to set the pressure provided at the outlet 18 of the regulator. Increasing the distance between the piston stem and the seal 58 requires greater air pressure build-up in the regulated pressure chamber 20 and on the piston head before the force exerted by the main spring 42 is overcome and the piston 38 is forced into the closed position. Moving the seal 58 closer to the piston stem decreases the air pressure build-up required in the regulated pressure chamber 20 to overcome the force exerted by the main spring 42 and to push the piston 38 into the closed position. Selecting a main spring 42 capable of exerting greater force increases the regulated pressure because higher air pressure build-up is required in the regulated pressure chamber 20 to force the piston 38 into the closed position. Decreasing the force exerted by the main spring 42 decreases the air pressure build-up required in the regulated pressure chamber 20 to force the piston into the closed position. Alternatively, magnetic force can be used to provide the force currently provided by the main spring 42. An additional alternate embodiment uses a stationary seal seat 62 and modifies the length of the piston 38 to increase or decrease the regulated pressure. Increasing the piston 38 length, decreases the pressure required to move the piston 38 into the closed position. Decreasing the piston 38 length, increases the regulated pressure. The regulated pressure of this alternate embodiment, does not allow the pressure to be adjusted in the field. The regulated pressure is set at the factory when the piston 38 is selected during assembly.

The secondary spring 34 increases the regulator's operating range. If the secondary spring 34 is removed from the embodiment of the invention, the lowest air pressure provided at the outlet 18 is greater than if the secondary spring 34 is present. Using a main spring 42 composed of spring washers, each with a load of 283 pounds at deflection and in the absence of the secondary spring 34, enabled the pressure at the outlet 18 to be adjusted linearly down to 150 psi. Keeping the main spring 42 the same, but adding the secondary spring 34 with load at deflection of 6.26 pounds, enabled the pressure at the outlet 18 to be adjusted linearly to regulate as low as 20 psi.

The diameter of the piston passage 48 is sized to supply the airflow required for consistent paintball marker performance during sustained use. The combined area of the bypass bores 78 is preferably equal to or greater than the area of the piston passage 48 to allow unrestricted flow from the high-pressure chamber 80 to the regulated pressure chamber 20 while the piston 38 is in the open position. Increasing the diameter of each bore or increasing the number of bores increases the combined area of the bypass bores 78. The preferred embodiment has four bypass bores 78; however, the number of bypass bores 78 can be more or less than the preferred embodiment. At least one bypass bore 78 should be present.

The fluid path from inlet 82 to outlet 18 does not force air to flow past any seal, except the seal 58 attached to the adjustment end 66 of the seal seat 62. For example, air does not flow between the outside of the piston stem and the piston stem bore 46 past the o-ring 52. Additionally air does not flow between the sides of the piston head and the piston chamber 36 past the o-ring 40. Channeling fluid flow through large, open passages and past a single seal 58 decreases the opportunity for foreign objects carried in the fluid, such as dirt, to get trapped by or to adhere to a surface or seal, thereby interfering with proper operation. The location at which the airflow passage, between the inlet 82 and the outlet 18, narrows is where the piston 38 contacts the seal 58. A seal 58 made of softer material is better adapted to sealing the piston passage 48 than a seal 58 made of harder material; however, softer material increases the likelihood of trapping dirt on the seal 58. The material for the seal 58 is preferably urethane; however, other suitable materials are neopreme, polyurethane, sorbothane, polytetrafluoroethylene or similar materials known to the art. Although the preferred configuration of the seal 58 is a disc of urethane, with a diameter approximately equal to the diameter of the seal end 64 of the seal seat 62, other configurations may be used such as an o-ring, a sphere or any other type of seal known to the art.

The preferred method of attaching the seal 58 to the seal end 64 of the seal seat 62 is with a retainer ring 60. A first end of the retainer ring 60 fits tightly around the seal end 64 of the seal seat 62. A second end of the retainer ring 60 secures the seal 58 against the seal end 64, yet has an opening large enough to allow the piston stem to pass through to contact the seal 58, thereby, stopping fluid flow. Other methods of attaching the seal 58 to the seal seat 62 depend on the type of material and the shape of the seal 58. An o-ring can be placed in a groove in the seal end 64. Disc shaped seals of various materials can also be attached to the seal end 64 with a rivet, a screw or other means of attachment. In an alternate embodiment, an annular seal is placed in a groove inside the piston passage 48 and the seal end 64 is conical in shape. The piston passage 48 is sealed when the conical seal end 64 contacts the seal inside the piston passage 48.

The high-pressure chamber 80 acts as a reservoir of high-pressure air to minimize the impact of a primary regulator incapable of providing the airflow necessary for sustained use. The volume of the high-pressure chamber 80 can be increased in size to the extent necessary to meet sustained airflow requirements. The volume of air in the bypass bores 78 and the seal chamber 56 also act as part of the high-pressure reservoir. Increasing the number or volume of bypass bores 78 or increasing the volume of the seal chamber 56 can also increase the high-pressure reservoir capacity of the regulator.

Another aspect of the embodiment of the invention is the ability to use the adjustment mechanism to shut off all airflow through the regulator. The piston 38 is forced into the shut-off position by turning the adjustment screw 86 clockwise until the seal seat 62, pushing against the piston stem, forces the piston head into contact with the secondary spring 34, which in turn contacts the top section 16. In the shut-off position, the piston 38 is held immobile and the seal 58 stops all fluid flow through the piston passage 48. The piston 38 stays in the shut-off position until the adjustment screw 86 is turned counter-clockwise such that the seal seat 62 moves axially away from the piston 38; thereby, allowing the piston to move in response to changes of fluid pressure in the regulated pressure chamber 20.

Another aspect of the embodiment of the invention is its modularity. Each section, the top 16, center 14 and base 12, can be manufactured with different characteristics. The top section 16 can be manufactured without instrument bores 26 or 32, or the diameter of the outlet 18 can vary, or the method in which it connects to the paintball marker can be modified or the diameter of the regulated pressure chamber 20 can be varied.

In addition, the center section 14 can contain springs that exert different force against the piston 38, or the diameter of the piston stem bore 46 and the piston stem can be modified, or the diameter of the piston passage 48 can be changed or the length of the piston can be modified or the secondary spring 34 can be omitted. The base section 12 can be constructed with a high-pressure chamber 36 of various sizes, or the diameter of the seal seat bore 70 and seal seat 62 can be modified, or the diameter of the inlet can be changed, or the diameter or number of bypass bores 78 can be varied or the volume of the seal chamber 56 can be modified or the angle of the ramp 72 can be changed.

Each section, with its particular characteristics, can be manufactured and assembled as independent sections in advance with final selection and assembly of the sections performed as required to meet market demand. The benefit derived from modular manufacture and assembly is enhanced if the connections between sections are unchanged regardless of the individual characteristics of a particular section; thereby, allowing any top section 16 to be connected to any center section 14 and any center section 14 to be connected to any base section 12. Final assembly of the regulator is accomplished when a top section 16, with desired characteristics, is attached to a center section 14 with desired characteristics that in turn is attached to a base section 12 with desired characteristics.

One embodiment of the invention is preferably manufactured using anodized aluminum for some parts and stainless steel for other parts. Other materials suitable for making the embodiment of the invention, in whole or in part, are titanium, brass, iron, steel, aluminum or plastic.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 80, sixth paragraph, unless the element is expressly recited using the phrase "means for."

What is claimed is:

1. An apparatus for regulating fluid pressure, comprising:
a body having an inlet at a first end and an outlet axially located at a second end;
a piston, having an axial passage open at both ends, being slidably mounted in said body, axially to said inlet and said outlet, said piston biased in an open position and being movable to a closed position in response to increased gas pressure on said piston;
a seal seat slidably mounted in said body axially to said axial passage, said seal seat having a seal end adapted to seal said axial passage and a shaped adjustment end; and,
an adjustment mechanism including a screw and a sphere, said screw disposable in a bore formed angularly to said body, said sphere in cooperation with said screw and said shaped adjustment end translates displacement of said screw into axial displacement of said seal seat.

2. The apparatus as defined in claim 1, additionally comprising a high-pressure chamber, said high-pressure chamber being in continuous fluid communication with said inlet and in fluid communication with said axial passage when said piston is in said open position.

3. The apparatus as defined in claim 1, wherein said piston is biased in the open position by a first spring and additionally comprising a second spring biasing the piston in the closed position.

4. The apparatus as defined in claim 1, wherein said screw in cooperation with said sphere and said seal seat hold said piston immobile in a shut-off position thereby stopping fluid flow out said outlet.

5. The apparatus as defined in claim 2, wherein said piston is biased in the open position by a first spring and additionally comprising a second spring biasing the piston in the closed position.

6. The apparatus as defined in claim 2, wherein said screw in cooperation with said sphere and said seal seat hold said piston immobile in a shut-off position thereby stopping fluid flow through said outlet.

7. An apparatus for regulating fluid pressure, comprising:
a top section having an outlet at a first end and a second end;
a center section having a third end, a fourth end, and a piston with an axial passage open at both ends slidably mounted in said center section, said piston biased in an open position and being movable to a closed position in response to increased gas pressure on said piston, said third end connecting to said second end; and,
a base section having a fifth end, an inlet at a sixth end, a seal seat adapted to seal said axial passage when said piston is in said closed position and means for adjusting fluid pressure at said outlet, said fifth end connecting to said fourth end, wherein said means for adjusting fluid pressure comprises a screw and a sphere, said screw disposable in an adjustment bore formed angularly to said base section, said sphere in cooperation with said screw and said seal seat translates displacement of said screw into axial displacement of said seal seat.

8. The apparatus as defined in claim 7, wherein said base section additionally comprises a high-pressure chamber, said high-pressure chamber being in continuous fluid communication with said inlet and in fluid communication with said axial passage when said piston is in said open position.

9. An apparatus for regulating fluid pressure, comprising:
a body including an inlet at a first end and an outlet at a second end;
a means for regulating fluid pressure at said outlet including a piston with an axial passage open at both ends, said piston being slidably mounted in said body, said piston biased in an open position and being movable to a closed position in response to increased gas pressure on said piston;
a means for sealing said axial passage when said piston is in said closed position including a seal seat slidably mounted in said body, said seal seat having a seal end adapted to seal said axial passage and a shaped adjustment end; and,
a means for adjusting fluid pressure at said outlet comprising a screw and a sphere, said screw disposable in an adjustment bore formed angularly to said body, said sphere in cooperation with said screw and said shaped adjustment end translates displacement of said screw into axial displacement of said seal seat.

10. The apparatus as defined in claim 9, additionally comprising a means for storing a reserve of high-pressure fluid.

11. An apparatus for regulating fluid pressure, comprising:
a body including an inlet at a first end and an outlet at a second end;
a means for regulating fluid pressure at said outlet including a piston with an axial passage open at both ends, said piston being slidably mounted in said body, said piston biased in an open position and being movable to a closed position in response to increased gas pressure on said piston;
a means for sealing said axial passage when said piston is in said closed position including a seal seat slidably mounted in said body, said seal seat having a seal end adapted to seal said axial passage and a shaped adjustment end;
a means for adjusting fluid pressure at said outlet wherein said means for adjusting fluid pressure causes axial displacement of said seal seat;
a means for biasing said piston in said closed position in opposition to said means for biasing said piston in said open position.

12. The apparatus as defined in claim 11, wherein said means for biasing said piston is said open position and said means for biasing said piston in said closed positions comprise springs.

13. An apparatus for regulating fluid pressure, comprising:
a body including an inlet at a first end and an outlet at a second end;
means for regulating fluid pressure at said outlet including a piston with an axial passage open at both ends, said piston being slidably mounted in said body, said piston biased in an open position and being movable to a closed position in response to increased gas pressure on said piston;
means for sealing said axial passage when said piston is in said closed position including a seal seat slidably mounted in said body, said seal seat including a seal end adapted to seal said axial passage and a shaped adjustment end;
means for adjusting fluid pressure at said outlet including a screw and a sphere wherein said screw disposable in an adjustment bore formed angularly to said body, said sphere in cooperation with said screw and said shaped adjustment end translates displacement of said screw into axial displacement of said seal seat; and,
means for storing a reserve of high-pressure fluid including a chamber, said chamber being in continuous fluid communication with said inlet and in fluid communication with said axial passage when said piston is in said open position.

14. The apparatus as defined in claim 13, additionally comprising means for biasing said piston in said closed position in opposition to said means for biasing said piston in said open position.

15. The apparatus as defined in claim 14, wherein said means for biasing said piston is said open position and said means for biasing said piston in said closed positions comprise springs.

16. The apparatus as defined in claim 15, wherein said inlet is at a first end of said body and said outlet is axially located at a second end of said body.

* * * * *